(12) United States Patent
Hsieh et al.

(10) Patent No.: US 7,973,860 B2
(45) Date of Patent: Jul. 5, 2011

(54) METHOD AND APPARATUS FOR ADJUSTING CONTRAST OF IMAGE

(75) Inventors: Tung-Lin Hsieh, Jhongli (TW); Yu-Wen Huang, Sanchong (TW); Yung-Sheng Hsu, Kaohsiung (TW); Hsu-Hung Chen, Sanchong (TW)

(73) Assignee: Quanta Computer Inc., Tao Yuan Shien (TW)

( * ) Notice: Subject to any disclaimer, the term of this patent is extended or adjusted under 35 U.S.C. 154(b) by 1280 days.

(21) Appl. No.: 11/592,430

(22) Filed: Nov. 2, 2006

(65) Prior Publication Data

US 2007/0216956 A1 Sep. 20, 2007

(30) Foreign Application Priority Data

Mar. 16, 2006 (TW) .............................. 95108874 A (51) Int. Cl.
*H04N 5/52* (2006.01)
(52) U.S. Cl. ......... 348/678; 348/603; 348/674; 348/673
(58) Field of Classification Search .................. 348/678, 348/674, 34, 353, 365, 404.1, 424.1, 603, 348/673, 686; 382/168–172, 274, 162, 254; H04N 5/52
See application file for complete search history.

(56) References Cited

U.S. PATENT DOCUMENTS

| | | | | |
|---|---|---|---|---|
| 6,351,558 | B1 * | 2/2002 | Kuwata | 382/168 |
| 6,915,024 | B1 * | 7/2005 | Maurer | 382/274 |
| 7,127,123 | B2 * | 10/2006 | Wredenhagen et al. | 382/274 |
| 7,573,533 | B2 * | 8/2009 | Moldvai | 348/678 |
| 2006/0239581 | A1 * | 10/2006 | Neuman | 382/274 |

FOREIGN PATENT DOCUMENTS

CN 1956495 A 10/2005

* cited by examiner

*Primary Examiner* — Trang U Tran
(74) *Attorney, Agent, or Firm* — Thomas | Kayden (57) ABSTRACT

This invention relates to an apparatus for processing an input image including M input pixels. Each of the M input pixels respectively has an input gray scale. The apparatus includes a gain generating module, a contrast enhancing module, and a Gamma adjusting module. The gain generating module generates a contrast gain and a minimum input gray scale in accordance with the input gray scales of the M input pixels. The contrast enhancing module adjusts the input gray scales in accordance with the contrast gain and the minimum input gray scale, to generate an intermediate image. The intermediate image includes M intermediate pixels, and each of the M intermediate pixels respectively has an intermediate gray scale. The Gamma adjusting module adjusts the intermediate gray scales lower than a first threshold in accordance with the contrast gain and outputs the adjusted intermediate image as an output image.

10 Claims, 7 Drawing Sheets

METHOD AND APPARATUS FOR ADJUSTING CONTRAST OF IMAGE

BACKGROUND OF THE INVENTION

1. Field of the Invention

The present invention relates to a method and an apparatus for image processing; in particular, the invention relates to a method and apparatus for contrast stretching of image.

2. Description of the Prior Art

Contrast stretching of image is referred as the expansion of the range of the gray scales of an image to the maximum range containable by a display. Using a display capable of showing an 8-bit gray scale as an example, the 256 gray scales of the display are usually expressed as gray scale 0 to gray scale 255. Generally speaking, due to factors like attenuation of signals and interference from noisy signals in received image signals, parts of the gray scales can be lost, and the actual gray scales of the image signals received by the display are usually less than 256. The purpose of image contrast stretching is to increase the range of distribution of image gray scales, by which to enhance image contrast for improving image qualities.

Figure 1:
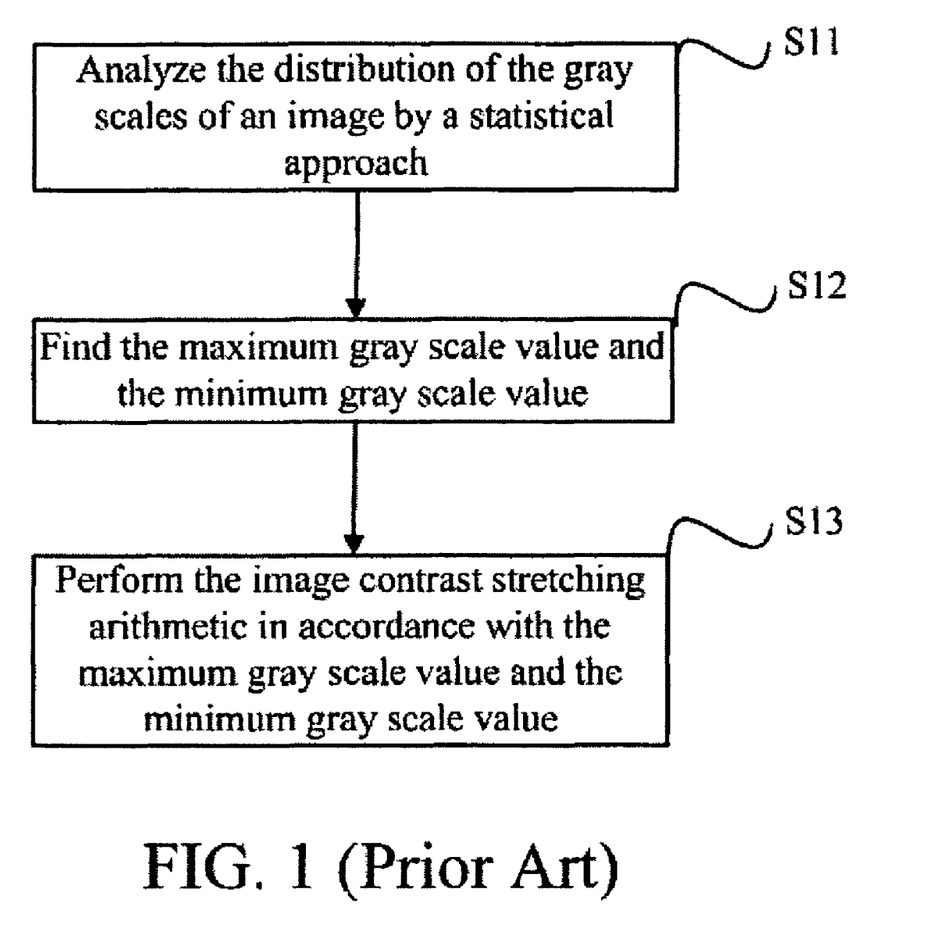
FIG. 1 is a flowchart showing the contrast stretching technology of image according to prior art.
Figure 2A:
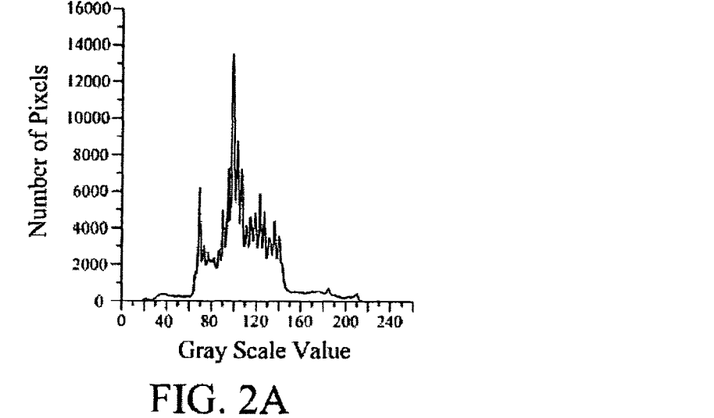
FIGS. 2A~2C are examples of histograms of red, green, and blue pixels in the same image to show the image properties.
Figure 2B:
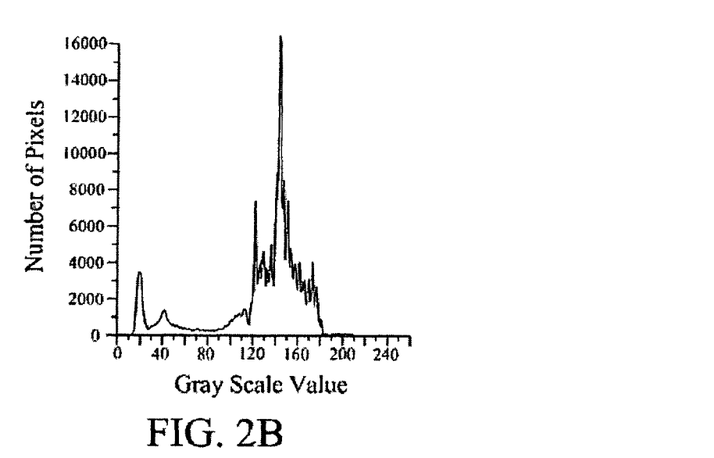
Figure 2C:
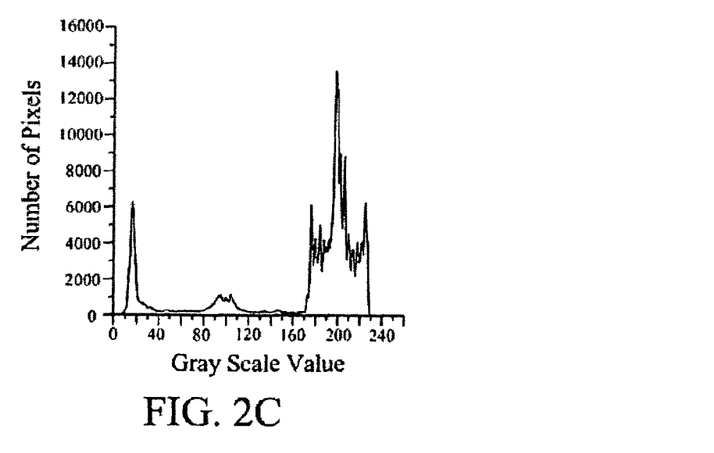

Referring to FIG. 1, FIG. 1 is a flowchart showing the contrast stretching technology of image according to prior art. First, step S11 uses a statistical approach to analyze the distribution of the gray scales of an image. Result of the analysis can be drawn into a histogram showing image properties, as shown in FIGS. 2A~2C. FIGS. 2A~2C are examples of histograms of red, green, and blue pixels in the same image to show the image properties. The horizontal axes in FIGS. 2A~2C represent the gray scale value, whereas the vertical axes represent the number of pixels; the distribution of the gray scales of an image can be understood through the histogram. FIG. 2A through FIG. 2C are respectively drawn to show the respective distribution of the gray scales of the red, the green, and the blue pixels in the same image.

Step S12 searches, in accordance with the histogram described above, for the maximum gray scale value and the minimum gray scale value to be used in the image contrast stretching arithmetic. Some current image processing methods defines the maximum gray scale value as the gray scale value corresponding to 0.5% of the area starting from the right side of the image property histogram, and the minimum gray scale value is defined as the gray scale value corresponding to 0.5% of the area starting from the left side of the image property histogram. Because colored images include red, green, and blue pixels in the images, the previously described maximum gray scale value, for colored images, is the highest maximum gray scale value among the maximum gray scale values of red, green, and blue pixels. Similarly, the minimum gray scale value of the colored image is the lowest minimum gray scale value selected from the minimum gray scale values of red, green, and blue pixels.

Step S13 searches, in accordance with the step S12, for the maximum gray scale value and the minimum gray scale value to perform an image contrast stretching arithmetic. Traditional formula for contrast stretching can be expressed in the following:

$$G'' = 255 \times \frac{G - \text{Min}}{\text{Max} - \text{Min}} \quad (1)$$

wherein G represents the original gray scale value, G" represents the gray scale value after stretching, Max represents the maximum gray scale value, and Min represents the minimum gray scale value.

Formula (1) can be rewritten into another expression:

$$G'' = k \times (G - \text{Min}) \quad (2)$$

$$\text{wherein, } k = \frac{255}{\text{Max} - \text{Min}}, \quad (3)$$

and k from formula (3) can be referred to as a contrast stretching coefficient or a contrast gain.

Figure 3A:
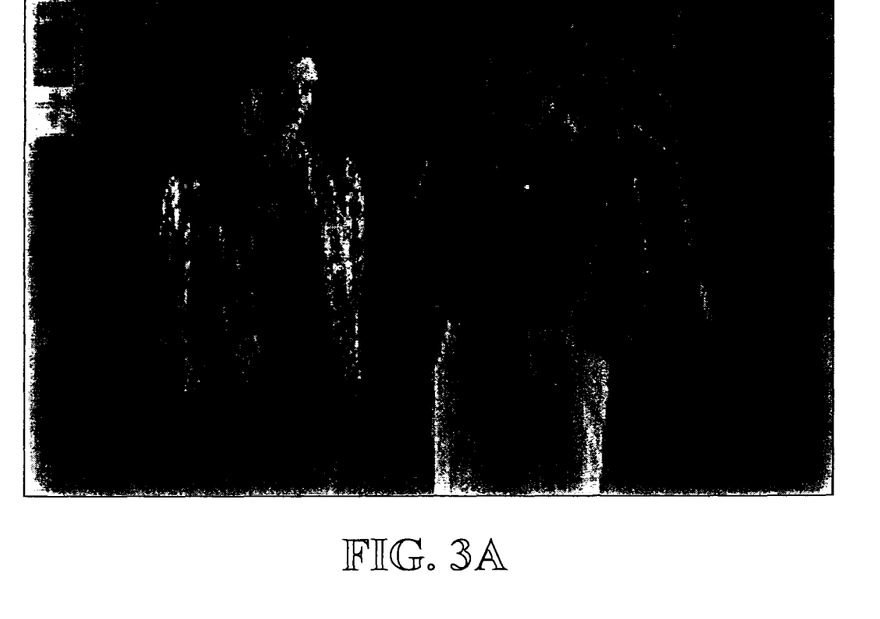
FIG. 3 is an example of an image before and after stretching.
Figure 3B:
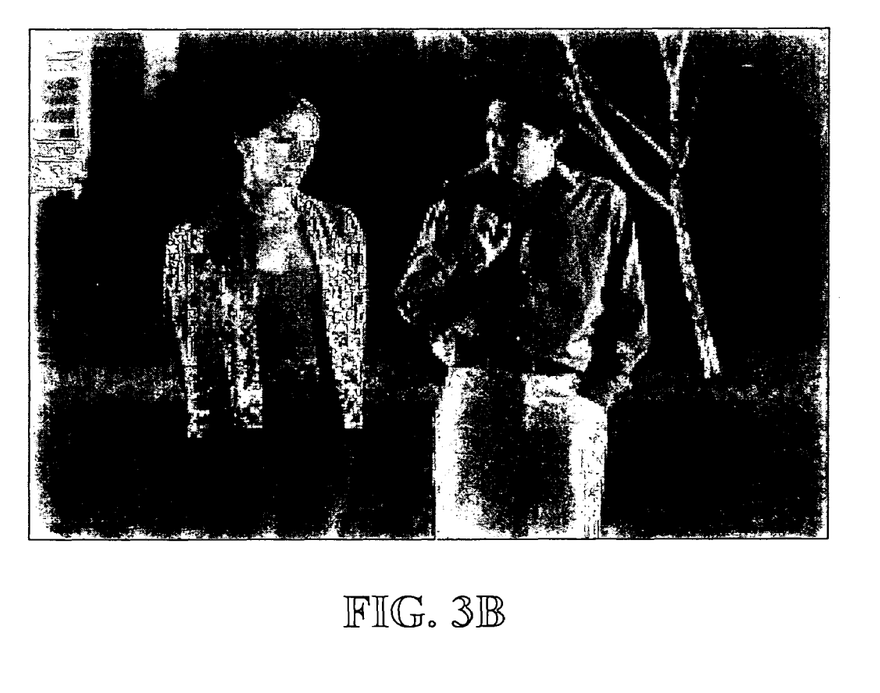

Using the image shown in FIG. 3A as an example, the original maximum gray scale value of the image is equal to 151, and the minimum gray scale value is equal to 0. The value k can be calculated using formula 3 to get 1.59, and the result of contrast stretching is shown in FIG. 3B. In comparison, the contrast of FIG. 3B is found to be substantially higher than that of FIG. 3A.

Generally speaking, the purpose of image contrast stretching is to improve the image quality. However, noisy signals in image signals are also proportionally amplified if using the contrast stretching technology of image that is in accordance with prior art. As for image signals, the signal intensity of lower gray scale signals are relatively weaker compared to higher gray scale signals and are more likely to be affected by noisy signals. Sometimes, the amplified noisy signals cause the poor image quality after contrast stretching, thus leading to adverse effects.

SUMMARY OF THE INVENTION

A scope of the invention is to provide a method and an apparatus for image processing. The method and the apparatus for contrast stretching of image, according to the invention, further includes procedures/hardware capable of suppressing low gray scale noisy signals, thus resolving the problems of proportionally amplifying noisy signals and causing the decreasing effect of contrast stretching, as described above.

According to a preferred embodiment of the invention, a preferred embodiment of the invention is an apparatus for processing a target video frame. The target video frame including M input pixels is included in a video stream, wherein M is a positive integer. Each of the input pixels respectively has an input gray scale. The apparatus includes a gain generating module, a contrast enhancing module, and a Gamma adjusting module. The gain generating module is used for generating, in accordance with the input gray scales of the M input pixels, a contrast gain and a minimum input gray scale. The contrast enhancing module is used for adjusting, in accordance with the contrast gain and the minimum input gray scale, the input gray scales of the M input pixels to generate an intermediate image. The intermediate image includes M intermediate pixels which each respectively has an intermediate gray scale. The Gamma adjusting module is used for adjusting, in accordance with the contrast gain, the intermediate gray scales lower than a first threshold, and then outputting the adjusted intermediate images as an output image.

According to another preferred embodiment of the invention, another preferred embodiment of the invention is a method for processing a target video frame. The method first generates, in accordance with the input gray scales of the M input pixels, a contrast gain and a minimum input gray scale.

The method then adjusts, in accordance with the contrast gain and the minimum input gray scale, the input gray scales of the M input pixels to generate an intermediate image. The intermediate image includes M intermediate pixels which each respectively has an intermediate gray scale. Finally, the method adjusts, in accordance with the contrast gain, the intermediate pixels lower than a first threshold and outputs the adjusted intermediate image as an input image.

The advantage and spirit of the invention may be understood by the following recitations together with the appended drawings.

DETAILED DESCRIPTION OF THE INVENTION

The scope of the invention is to provide a method and an apparatus for adjusting contrast of images and for suppressing low gray scale noisy signals. This invention can be used for adjusting a single, individual image and each of the video frames in a video stream.

Figure 4:
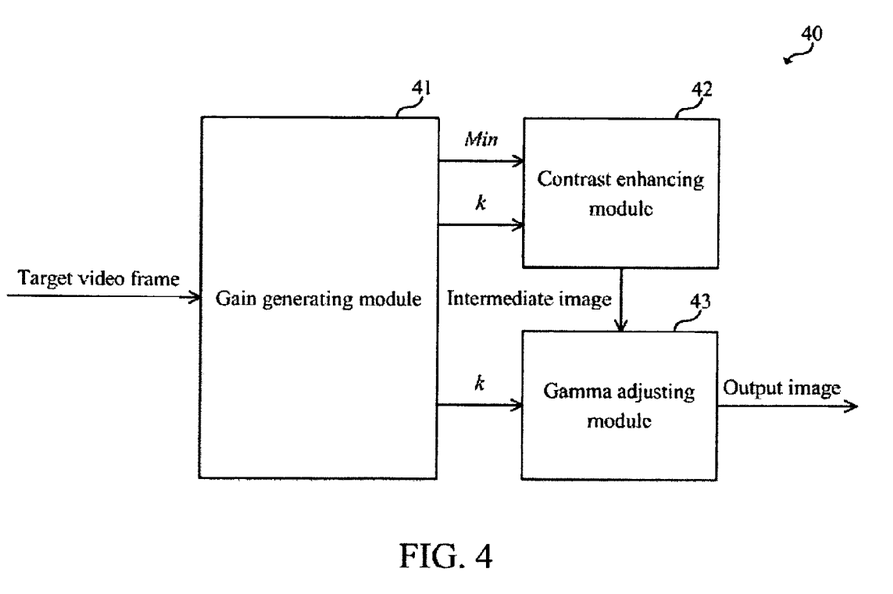
FIG. 4 is a functional block diagram showing an image processing apparatus according to a preferred embodiment of the invention.

According the first preferred embodiment of the invention, the first preferred embodiment of invention is an apparatus for processing a target video frame. The target video frame, including M input pixels wherein M is a positive integer, is included in a video stream. Each of the input pixels respectively has an input gray scale. Referring to FIG. 4, FIG. 4 is a functional block diagram showing an image processing apparatus 40 according to a preferred embodiment of the invention. The image processing apparatus 40 includes a gain generating module 41, a contrast enhancing module 42, and a Gamma adjusting module 43.

The gain generating module 41 generates, in accordance with the input gray scales of the M input pixels, a contrast gain k and a minimum input gray scale Min. The contrast enhancing module 42 adjusts, in accordance with the contrast gain k and the minimum input gray scale Min, the input gray scales of the M input pixels, so as to generate an intermediate image including M intermediate pixels, each of which respectively has an intermediate gray scale. Operations of the contrast enhancing module 42 can be shown in formula (2). That is, the minimum input gray scale Min is respectively subtracted from each input gray scale, and then it is multiplied by the contrast gain k to obtain the intermediate gray scale. In a practical application, the contrast enhancing module 42 can also use a look-up table to find the most appropriate contrast gain k and the minimum input gray scale Min.

As described in the background of the invention, signal intensity of lower gray scale signals are relatively lower and are more easily affected by interferences from noisy signals. Therefore, in addition to the gain generating module 41 and the contrast enhancing module 42, the invention further includes a Gamma adjusting module 43 for suppressing low gray scale noisy signals.

The Gamma adjusting module 43 adjusts, in accordance with the contrast gain k, the intermediate pixels lower than a first threshold, and then outputs the adjusted intermediate image as an output image. For example, if a designer thinks that images with a gray scale value greater than 96 are not easily affected by the noisy signals, the first threshold can be set at the gray scale value 96, so that the Gamma adjusting module 43 adjusts the intermediate pixels with a gray scale value lower than 96 only. In a practical application, the Gamma adjusting module 43 can include a selecting unit, a look-up table, and an adjusting unit. The look-up table is used for storing a plurality of Gamma curves corresponding to every contrast gain k. The selecting unit can select, in accordance with the contrast gain k, a corresponding Gamma curve from the look-up table. The adjusting unit can adjusts, in accordance with the Gamma curve, the intermediate gray scales lower than the first threshold. The adjusting unit is used for respectively multiplying the intermediate gray scales lower than the first threshold by the Gamma gain values corresponding to the Gamma curve in every gray scale, for optimally reducing the intermediate gray scales after adjustments. By doing this, the invention can avoid the problem of amplifying low gray scale noisy signals after image contrast stretching.

Furthermore, due to the fact that human eyes can not distinguish among image signals with gray scale values lower than 32, the Gamma curve can be further segmented into two parts, including a first sub-curve and a second sub-curve which correspond to the gray scale value ranges of 0-32 and 32-64, respectively. The first sub-curve is used for pixels with gray scale values lower than 32, whereas the second sub-curve is used for pixels with gray scale values between 32 and 64. The adjusting unit can adjusts, in accordance with the first cub-curve, the intermediate gray scales lower than a second threshold (32). The adjusting unit further adjusts, in accordance with the second sub-curve, the intermediate gray scales between the first threshold (64) and the second threshold (32). The purpose of applying different degrees of adjustments to different ranges of gray scale values is to more precisely improve image qualities.

In a practical application, the gain generating module 41 can be as what is shown in FIG. 5A, FIGS. 5A~5D are diagrams showing a few possible configurations of the gain generating module 41. The gain generating module 41 includes a statistical unit 41A and a generating unit 41B. The statistical unit 41A applies, in accordance with prior art, the statistical approach for creating histograms to select a maximum input gray scale and the minimum input gray scale Min from all of the input gray scales, while the generating unit 41B is used for generating the contrast gain k according to the maximum and minimum input gray scale.

Figure 5A:
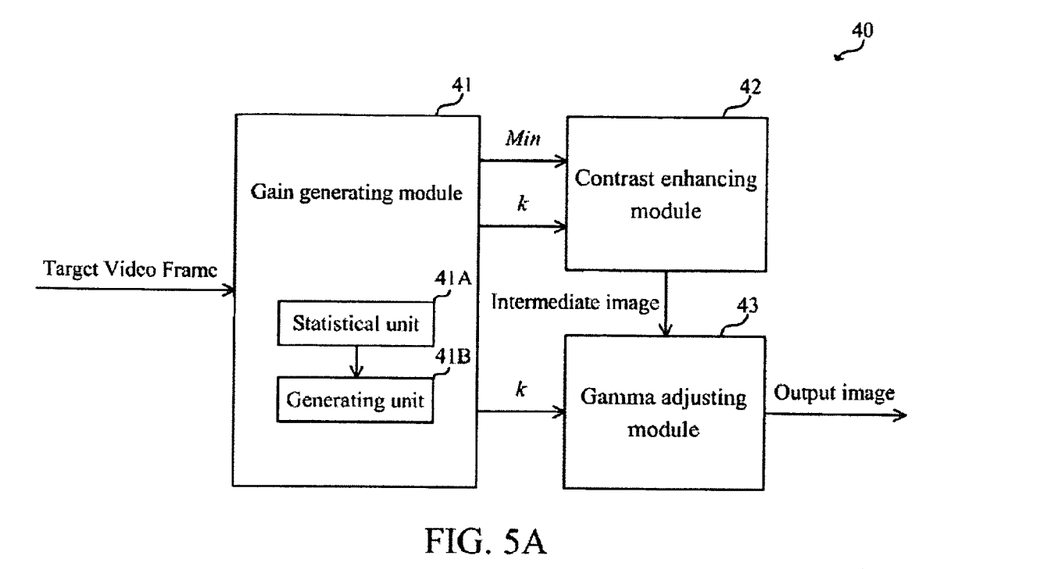
FIGS. 5A~5D are diagrams showing a few possible configurations of the gain generating module 41.
Figure 5B:
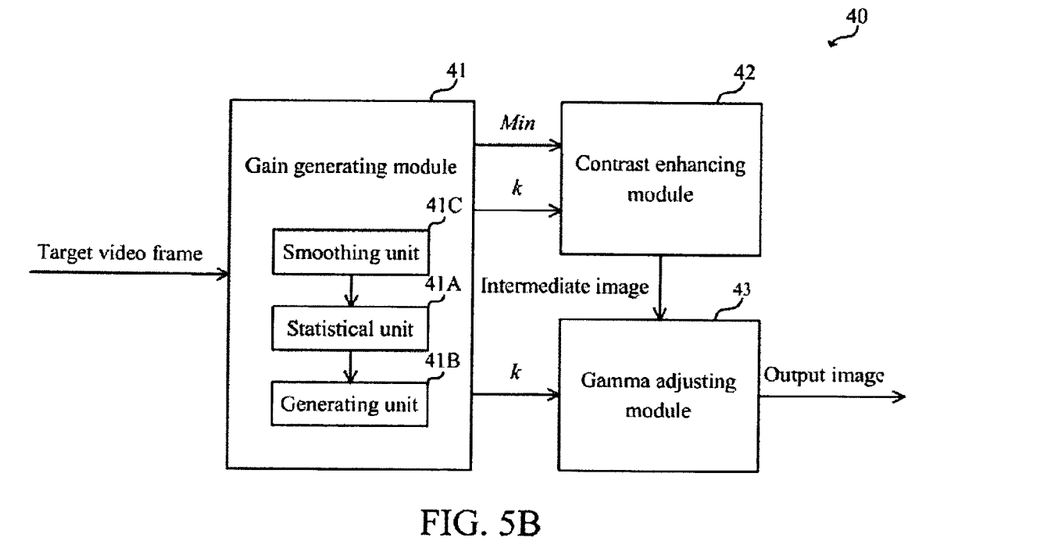

Because the target video frame might be sharpened by other image processing chips or steps before entering the image processing module 40, the gain generating module 41 selectively contains a smoothing unit 41C for removing the effects caused by sharpening on the input gray scales, as shown in FIG. 5B. The smoothing unit 41C first performs a smoothing calculation on the M input gray scales. The statistical unit 41A then selects a maximum input gray scale and the minimum input gray scale Min from the smoothed input gray scales.

Figure 5C:
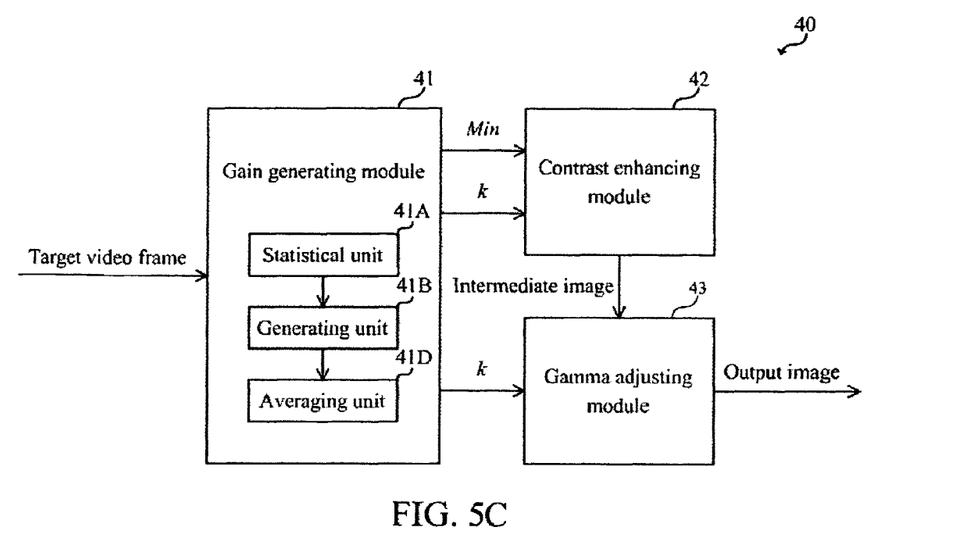

On the other hand, because the noisy signals can possibly cause the maximum input gray scale and the minimum input gray scale selected by the statistical unit 41A to deviate and in turn to cause the subsequently generated contrast gain k to abnormally increase or decrease, the gain generating module 41 can selectively include an averaging unit 41D, as shown in FIG. 5C. Assuming that in the video stream, the target video frame is adjacent to N adjacent video frames, wherein N is a positive integer. The statistical unit 41A shown in FIG. 5C first uses a statistical approach to select an initial maximum input gray scale and an initial minimum input gray scale from the input gray scales. The generating unit 41B then generates, in accordance with the initial maximum input gray scale and the initial minimum input gray scale, an initial gain. The averaging unit 41D can then average the initial gain and N adjacent gains to generate a contrast gain k. The N adjacent gains are the respective contrast gains of the N adjacent video frames. The averaging unit 41D can further average the initial minimum input gray scale and the N adjacent minimum gray scales to generate the minimum input gray scale Min. The N adjacent minimum gray scales are the respective minimum input gray scales of the N adjacent video frames. By using the averaging approach, the invention can decrease the effects caused by noisy signals and avoid the problem of flickering images caused by noisy signals.

Figure 5D:
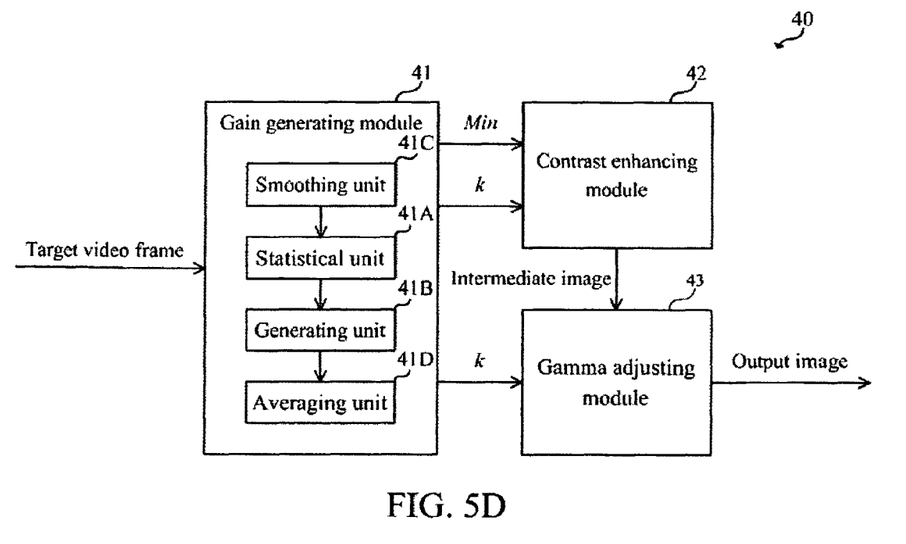

As shown in FIG. 5D, the gain generating module 41 can possibly simultaneously include the statistical unit 41A, the generating unit 41B, the smoothing unit 41C, and the averaging unit 41D described above.

Figure 6:
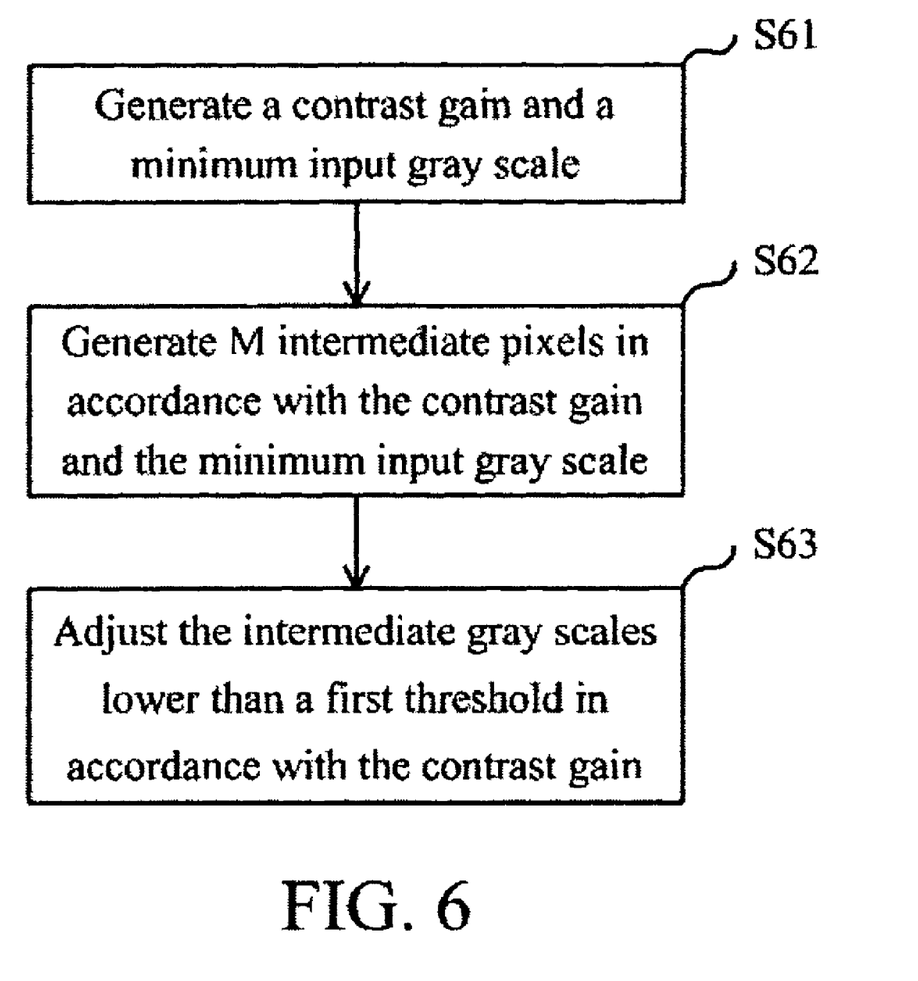
FIG. 6 is a flowchart showing an image processing method according to a second preferred embodiment of the invention.

Referring to FIG. 6, FIG. 6 is a flowchart showing an image processing method according to a second preferred embodiment of the invention. According to the second preferred embodiment of the invention, the second preferred embodiment of the invention is a method for processing a target video frame. The method first executes step S61 to generate, in accordance with the input gray scales of the M input pixels, a contrast gain and a minimum input gray scale. The method then executes step S62 to adjust, in accordance with the contrast gain and the minimum input gray scale, the input gray scales of the M input pixels to generate an intermediate image; the intermediate image includes M intermediate pixels, each of which respectively has an intermediate gray scale. Finally, the method executes step S63 to adjust, in accordance with the contrast gain, the intermediate gray scales lower than a first threshold, and then outputs the adjusted intermediate image as an output image.

Because the method and the apparatus for image processing, according to the invention, further include procedures/hardware for suppressing low gray scale noisy signals after image contrast stretching, problems like proportionally amplifying noisy signals (which occurred in prior art) and decreasing the effects of image contrast stretching can be resolved.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. An apparatus for processing a target video frame comprised in a video stream comprising M input pixels, M being a positive integer, each of the M input pixels respectively having an input gray scale, the target video frame being adjacent to N adjacent video frame, N being a positive integer, said apparatus comprising:
    a gain generating module for generating, in accordance with the input gray scales of the M input pixels, a contrast gain and a minimum input gray scale, wherein the gain generating module comprises:
        a statistical unit for selecting an initial maximum input gray scale and an initial minimum input gray scale from the input gray scales by a statistical approach;
        a generating unit for generating, in accordance with the initial maximum input gray scale and the initial minimum input gray scale, an initial gain; and
        an averaging unit for averaging the initial gain and N adjacent gains associated with the N adjacent video frames to generate the contrast gain, the averaging unit further being used for averaging the initial minimum input gray scale and N adjacent minimum gray scales associated with the N adjacent video frames to generate the minimum input gray scale;
    a contrast enhancing module for adjusting, in accordance with the contrast gain and the minimum input gray scale, the input gray scales of the M input pixels to generate an intermediate image comprising M intermediate pixels which each respectively has an intermediate gray scale; and
    a Gamma adjusting module for adjusting, in accordance with the contrast gain, the intermediate gray scales lower than a first threshold and for outputting the adjusted intermediate image as an output image.

2. The apparatus of claim 1, wherein the gain generating module comprises:
    a smoothing unit for performing a smoothing calculation on the M input gray scales.

3. The apparatus of claim 1, wherein the Gamma adjusting module comprises:
    a selecting unit for selecting, in accordance with the contrast gain, a Gamma curve from a look-up table; and
    an adjusting unit for adjusting, in accordance with the Gamma curve, the intermediate gray scales lower than the first threshold.

4. The apparatus of claim 3, wherein the Gamma curve comprises a first sub-curve and a second sub-curve, the adjusting unit adjusts, in accordance with the first sub-curve, the intermediate gray scales lower than a second threshold, and the adjusting unit further adjusts, in accordance with the second sub-curve, the intermediate gray scales between the first threshold and the second threshold, the second threshold being smaller than the first threshold.

5. An apparatus for processing an input image comprising M input pixels, M being a positive integer, each of the M input pixels respectively having an input gray scale, said apparatus comprising:
    a gain generating module for generating, in accordance with the input gray scales of the M input pixels, a contrast gain;
    a contrast enhancing module for adjusting, in accordance with the contrast gain, the input gray scales of the M input pixels to generate an intermediate image comprising M intermediate pixels which each respectively has an intermediate gray scale; and
    a Gamma adjusting module for adjusting, in accordance with the contrast gain, only the intermediate gray scales lower than a first threshold and for outputting the adjusted intermediate image as an output image, wherein the first threshold is lower than a maximum of the intermediate gray scales.

6. A method for processing a target video frame comprised in a video stream comprising M input pixels, M being a positive integer, each of the M input pixels respectively having an input gray scale, the target video frame being adjacent to N adjacent video frame, N being a positive integer, said method comprising:

(a) generating a contrast gain and a minimum input gray scale in accordance with the input gray scales of the M input pixels by using a gain generating module, wherein the step (a) further comprises:

(a1) selecting an initial maximum input gray scale and an initial minimum input gray scale from the input gray scales through a statistical approach by using a statistical unit of the gain generating module;

(a2) generating an initial gain in accordance with the initial maximum input gray scale and the initial minimum input gray scale by using a generating unit of the gain generating module; and (a3) averaging the initial gain and N adjacent gains associated with the N adjacent video frames to generate the contrast gain, and further averaging the initial minimum input gray scale and N adjacent minimum gray scales associated with the N adjacent video frames to generate the minimum input gray scale by using an averaging unit of the gain generating module;

(b) generating an intermediate image comprising M intermediate pixels which each respectively has an intermediate gray scale in accordance with the contrast gain and the minimum input gray scale by using a contrast enhancing module; and (c) adjusting the intermediate gray scales lower than a first threshold and outputting the adjusted intermediate image as an output image in accordance with the contrast gain by using a gamma adjusting module.

7. The method of claim 6, wherein the step (a) comprises the sub-step of:

performing a smoothing calculation on the M input gray scales using a smoothing unit of the gain generating module.

8. The method of claim 6, wherein the step (c) comprises the sub-steps of:

(c1) selecting a Gamma curve from a look-up table in accordance with the contrast gain by using a selecting unit of the gamma adjusting module; and (c2) adjusting the intermediate gray scales lower than the first threshold in accordance with the Gamma curve by using an adjusting unit of the gamma adjusting module.

9. The method of claim 8, wherein the Gamma curve comprises a first sub-curve and a second sub-curve, the step (c2) adjusts the intermediate gray scales lower than a second threshold in accordance with the first sub-curve, the step (c2) further adjusts the intermediate gray scales between the first threshold and the second threshold in accordance with the second sub-curve, and the second threshold is smaller than the first threshold.

10. A method for processing an input image comprising M input pixels, M being a positive integer, each of the M input pixels respectively having an input gray scale, said method comprising the steps of:

generating a contrast gain in accordance with the input gray scales of the M input pixels by using a gain generating module;

generating an intermediate image comprising M intermediate pixels which each respectively has an intermediate gray scale, in accordance with the contrast gain by using a contrast enhancing module; and adjusting only the intermediate gray scales lower than a first threshold and outputting the adjusted intermediate image as an output image in accordance with the contrast gain by using a gamma adjusting module, wherein the first threshold is lower than a maximum of the intermediate gray scales.

* * * * *